United States Patent [19]

Zatezalo et al.

[11] Patent Number: 4,623,979
[45] Date of Patent: Nov. 18, 1986

[54] METHOD AND CALCULATOR FOR DETERMINING OFFSET AND ANGULARITY OF COUPLED SHAFTS

[75] Inventors: John M. Zatezalo, Baldwin; Lucian J. Spalla, McMurray, both of Pa.

[73] Assignee: Industrial Maintenance Systems, Inc., Pittsburgh, Pa.

[21] Appl. No.: 575,343

[22] Filed: Jan. 31, 1984

Related U.S. Application Data

[63] Continuation-in-part of Ser. No. 329,707, Dec. 11, 1981, Pat. No. 4,463,438.

[51] Int. Cl.$^4$ ............................................. G06F 15/46
[52] U.S. Cl. ..................................... 364/715; 364/709; 364/462; 364/561
[58] Field of Search ............... 364/715, 709, 710, 561, 364/460, 462

[56] References Cited

U.S. PATENT DOCUMENTS

| | | | |
|---|---|---|---|
| 3,976,975 | 8/1976 | Cochran | 364/709 |
| 3,979,057 | 9/1976 | Katz et al. | 364/706 |
| 3,979,058 | 9/1976 | Katz et al. | 364/706 |
| 4,060,719 | 11/1977 | Dalinowski | 364/729 |
| 4,081,859 | 3/1978 | Goldsamt et al. | 364/709 |
| 4,218,755 | 8/1980 | Root | 364/900 |
| 4,234,924 | 11/1980 | LaVance et al. | 364/460 |
| 4,382,280 | 5/1983 | Mandel et al. | 364/412 |
| 4,463,438 | 7/1984 | Zatezalo et al. | 364/715 |

OTHER PUBLICATIONS

Durkin, "Aligning Shafts Part I–Measuring Misalignment", *Plant Engineering*, Jan. 11, 1979, pp. 86–90.
Durkin, "Aligning Shafts Part II–Correcting Misalignment", *Plant Engineering*, Feb. 8, 1979, pp. 102–105.
IMS Operations Manual, Copyright 1980. Industrial Maintenance System, Inc.
Brochure: A Machinery Alignment System for Industry, Industrial Maintenance System, Inc.

*Primary Examiner*—David H. Malzahn
*Attorney, Agent, or Firm*—Buell, Ziesenheim, Beck & Alstadt

[57] ABSTRACT

The specification discloses a calculator and method for calculating degree of offset and angularity of two shafts coupled together. At least one illustration of two machines having coupled shafts with gauges mounted on them appears on the face of the calculator. A series of indicator lights are placed near the illustration which light in sequence to indicate to the user what measurements to take and the sequence in which to enter this data. The calculator contains the appropriate equations in its memory for calculating offset and angularity from the data entered by the user. Y 8 Claims, 5 Drawing Figures

METHOD AND CALCULATOR FOR DETERMINING OFFSET AND ANGULARITY OF COUPLED SHAFTS

CROSS-REFERENCE TO RELATED APPLICATIONS

This is a continuation-in-part of our U.S. Pat. application Ser. No. 329,707, filed Dec. 11, 1981, now U.S. Pat. No. 4,463,438.

FIELD OF THE INVENTION

The invention relates to methods and calculators which are used to determine the relative position of two interconnected shafts so that there will be proper alignment between the two shafts.

DESCRIPTION OF THE PRIOR ART

Wherever two rotating shafts are coupled together it is important that their axis of rotation be the same. Misalignment of the shafts causes vibrations which cause excessive wear and destruction of couplings, bearings, seals gears and other components. Today, misalignment is the primary cause of more than 50 percent of all rotating machinery failures in many industries.

There are well known equations which can be used to determine how to adjust the position of two coupled machines so that the interconnected shafts between them are properly aligned. To use the equations one must make certain measurements, insert those measurements in the equations and solve them. The solutions will tell the user how much and in what direction to move the machines so that their shafts will be properly aligned. Although these equations are well known they are seldom used. People in the field are unwilling to take the time to make the necessary measurements and solve the equations. Many are also uncomfortable in using the equations because they fear they will enter the wrong measurements or make other mistakes.

The result is that most alignments are now done by trial and error or visual inspection. The trial and error method is costly and time consuming. Through experience many people have developed a "feel" for proper alignments and rely upon that "feel" to do the job. However, misalignments of a few thousands of an inch cannot be seen, yet they can cause serious damage. Usually an alignment is considered to be proper when it in fact is not.

In our U.S. Pat. No. 4,463,438 we disclose a calculator which will tell any mechanic how to align coupled machinery. Through a unique visual display the calculator tells the mechanic what measurements to make and in what order to make them. The mechanic simply enters those measurements in the sequence specified by the calculator and the device will tell him how much to shim the front and back feet of one of the coupled machines so that the coupled shafts will be properly aligned.

Even though our calculator tells the mechanic how to shim the machine to obtain perfect alignment, in practice a perfect alignment may not be possible to achieve. The mechanic may not have the right size shims. The measurements he has taken may be slightly wrong. Or, the mechanic may not have the time or patience to make all of the needed adjustments.

Recognizing that a perfect alignment will not be obtained, the art has struggled to define acceptable alignments within set tolerances. Many have suggested that one could define those tolerances in terms of the relative positions of the coupled shafts. One could imagine an axis passing through the center of each shaft. The slope of one axis relative to the other axis can be defined as angularity. The distance between the two axes at any point would be the offset at that point. Typically, the amount of offset would differ at various points along the axes. Offset and angularity ranges or tolerances could then be set and used to determine whether an alignment is acceptable.

The offset and angularity approach has been tried without much success. Attempts have been made to define offset and angularity in terms of readings shown on gauges attached to the coupled shafts. Problems developed when people tried to define acceptable limits in terms of these readings. Any mechanic could obtain several different readings on any given alignment depending upon where he took his measurements. In the event that he obtained unacceptable values for the offset and angularity of two coupled shafts, he could move the gauges and take new measurements at other points to obtain acceptable values. Almost any alignment could be shown to meet these specifications by moving the gauges. Furthermore, when people did define tolerances in terms of gauge readings they found that a different set of tolerances was needed for each type of machine. Given readings on a small machine would correspond to an acceptable alignment, but the same readings on a large machine would not indicate an acceptable alignment.

BRIEF DESCRIPTION OF THE PREFERRED EMBODIMENTS

We have developed a method and calculator for measuring offset and angularity of coupled shafts which overcome the problems of prior art techniques. In our method we establish reference points on the coupled shafts where readings are to be taken with gauges mounted on the shafts. Then distances between gauges, distances between a gauge and the feet of the machine to be shimmed and the distance between the feet of the machine to be shimmed are measured. These measurements and readings can be applied to known formulae to determine the amount that the front foot and back foot of the machine must be shimmed to create a proper alignment. Then we take the differences between the two shim distances and divide that difference by the distances by the distance between the front foot and back foot of the machine to be shimmed. The difference is our value for angularity of a given alignment. We prefer to make the necessary conversions to express angularity in terms of thousands of an inch per inch. To determine offset we define a center line through the coupling of the coupled shaft. Next, we measure the distance between the enter line of the coupling and the front foot of the machine to be shimmed. We multiply that distance by the angularity and subtract the shim distance for the front foot. The result is a value for offset at the center line of the coupling which we define at the offset for the coupled shafts. We recognize that one could use other points along the coupling and shafts as the reference point for determining the offset of the system. We chose the center line of the coupling because distance measurements from the coupling center line are likely to be more accurate. Furthermore, we have found that the offset at this point more directly corresponds to the level of vibration and resulting damage in an improper alignment.

Our calculator contains a keyboard for entering data, a data display and a memory for storing data and containing the necessary equations. We also provide a face plate which contains at least one illustration of two machines having coupled shafts and indicia which identifies the coupling center line, front foot and back foot of the machine to be shimmed, and the distances to be measured. Indicator means are provided near the illustration to tell the user what measurements to make and the order in which to make them. After all the measurements are entered into the calculator the user simply pushes a button to learn the angularity and hits another button to find the offset. These values as well as the measurement data are shown in the display.

Our calculator is easy to use. Any mechanic can be taught to use it in a few short hours. With our calculator it takes only a short time to determine offset and angularity. those values will always be the same for any given alignment. Thus, it is now possible to set meaningful alignment standards. When those standards are met, unscheduled downtime and maintenance time are reduced. Because the operating efficiency of coupled shafts is increased by better alignment, less energy is consumed during operation.

Our calculator is compact and easy to transport to and from the jobsite. It can operate on AC or battery power. Because it can be made from off the shelf components and employs printed circuitry it is durable and relatively inexpensive to produce.

Other details, objects and advantages of the invention will become apparent as a description of a present preferred embodiment of the invention proceeds.

DESCRIPTION OF THE DRAWINGS

In the accompanying drawings, we have shown illustrative diagrams and a present perferred embodiment of our calculator in which.

DETAILED DESCRIPTION OF A PRIOR ART METHOD FOR MEASURING SHAFT POSITIONS

Figure 1:
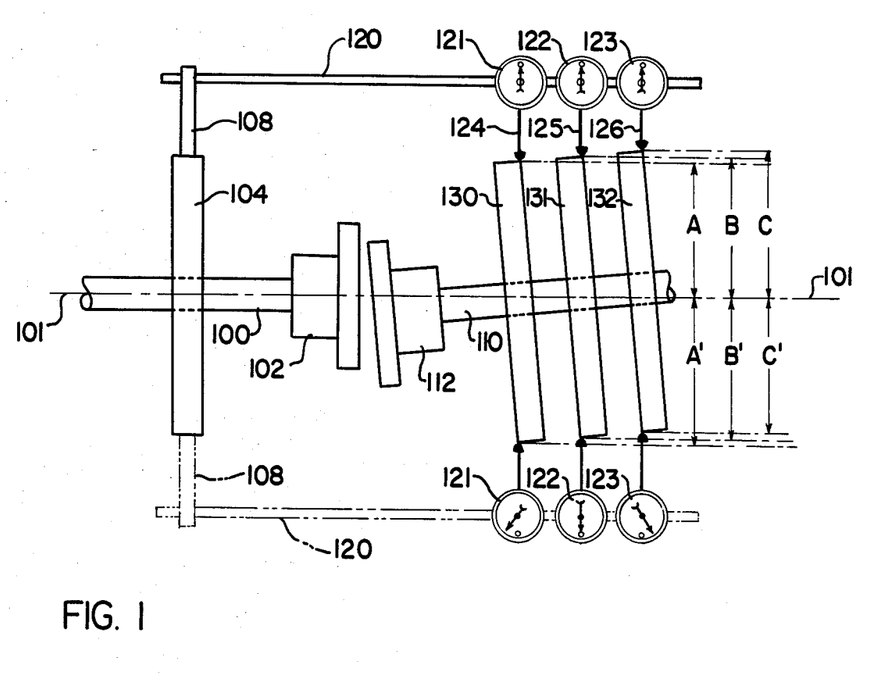
FIG. 1 is a diagram of two misaligned shafts coupled by a flexible coupling and having gauges attached thereto.

Referring to FIG. 1 we have illustrated two shafts 100 and 110 which are severely misaligned. These shafts are coupled through a flexible coupling having left half 102 and right half 112. A clamp 104 is mounted on shaft 100 perpendicular to the shaft 100. A pin 108 extends from clamp 104 and holds rod 120. Rod 120 runs parallel to shaft 100 and extends over shaft 110. A single gauge would normally be positioned on the end of rod 120. That gauge would abut shaft 110 or the top of a clamp mounted perpendicularly on shaft 110. In the past people have tried to define some range of gauge readings which would correspond to an acceptable alignment. FIG. 1 illustrates why those attempts have been fruitless. Three gauges 121, 122 and 123 are mounted on the end of rod 120. Pins 124, 125 and 126 extend from each gauge and abut the top of one of three identical clamps 130, 131 and 132 mounted on shaft 110. The tops of these clamps are parallel to shaft 110. Notice that the distance which pin 124 extends from gauge 121 is more than the length of pin 125 which is longer than pin 126. The ends of these pins are also at different distances from the center line 101 of shafts 100. These distances are indicated by letters A, B and C. Thus, if a single gauge were used and readings are taken at points corresponding to gauges 121, 122 and 123, three different readings would be obtained. These gauges are all set at zero to illustrate what happens when the gauges are moved about the shaft. When the gauges are rotated 180° to the position shown in dotted lines the readings will change again as shown by the gauge arrows. Gauge 121 has moved in a positive direction; gauge 122 remained at zero; and gauge 123 moved in the negative direction. The change occurred because the tips of pins 124 and 126 are at different distances from center line 101. The distance A of pin 124 has increased to distance A'. Distance B equals distance B'. Distance B has not changed even though pin 125 has moved to the opposite edge of clamp 131. The distance C of pin 126 has decreased to distance C'. The gauge readings depend upon the position of the gauge along the shaft. Thus, it is useless to set alignment standards based solely on gauge readings.

DESCRIPTION OF THE PREFERRED METHOD

Our method focuses upon the position of the machine to be shimmed. If that changes, the position of its shaft also changes. We begin by determining the distances that the front foot and back foot of one machine must be shimmed in order for its shaft and the shaft of a second machine to be properly aligned. The technique for making those determinations is discussed later in the description of our preferred calculator. The difference between those shim distances corresponds to the degree to which the center line of the shaft of the machine has risen or fallen over the distance between the front foot and the back foot of the machine. If we divide that difference by the distance between the front foot and the back foot, we have computed angularity. We can then use angularity to compute offset.

Figure 2:
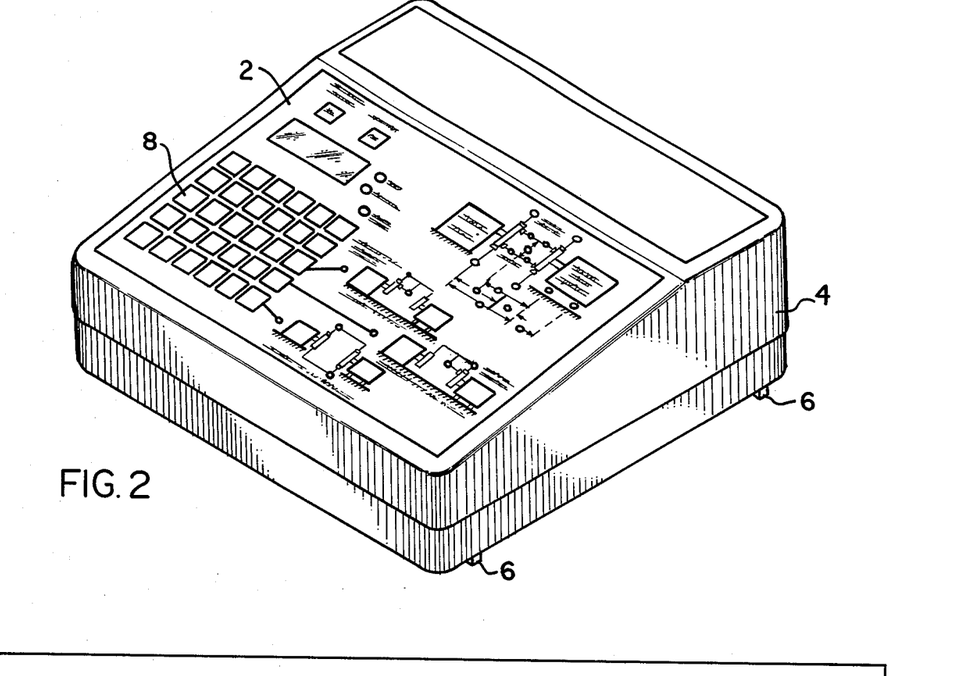
FIG. 2 is a perspective view of a present preferred embodiment of our calculator.
Figure 3:
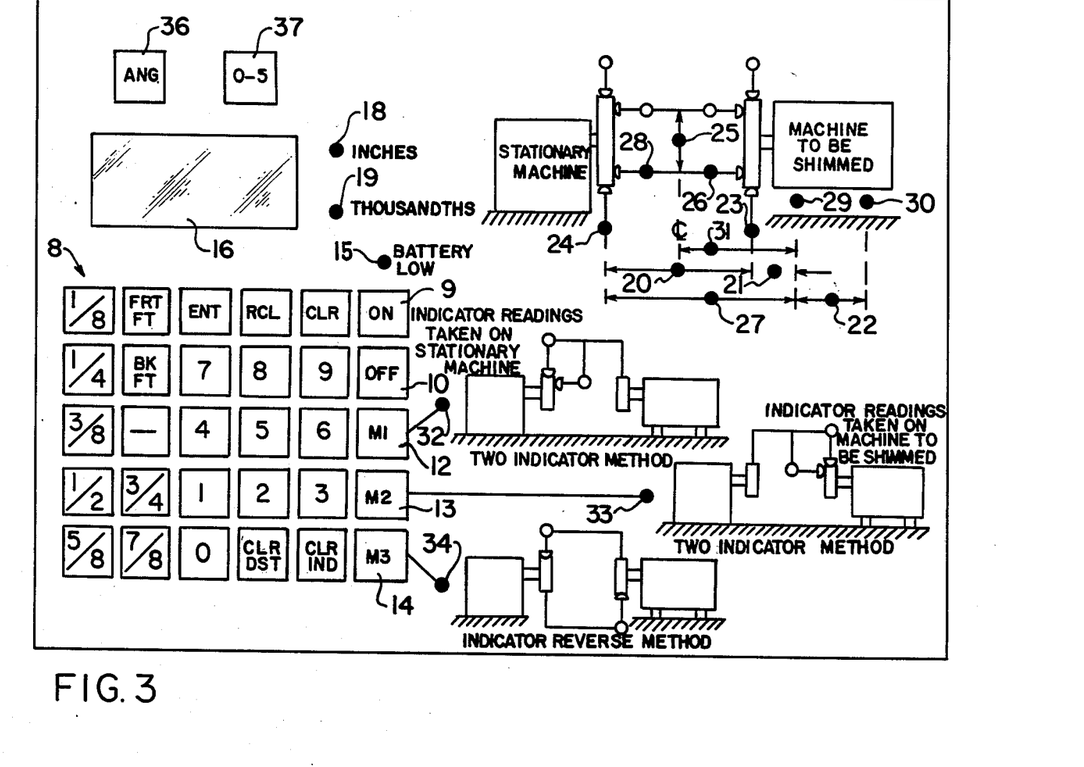
FIG. 3 is a top plan view of the face plate and keyboard of the embodiment of FIG. 1.

Our method can best be understood by referring to FIGS. 2 and 3. There we show our calculator which is comprised of a face plate 2 fitted onto a housing 4 in which the circuitry is contained. On the face plate we illustrate a "Stationary Machine" whose shaft is coupled to the shaft of a "Machine to be Shimmed". Indicator lights 20 through 31 are positioned on the illustration to indicate various points where gauge readings and measurements should be taken.

Assuming that the shafts of the Stationary Machine and the Machine to be Shimmed are misaligned we can determine the distances to shim the back foot and front foot of the Machine to be Shimmed in order to correct the misalignment. The method we use to calculate those distances is discussed in detail below in connection with our calculator. While we calculate those shim distances we measure the distance between the front foot and back foot of the machine to be shimmed marked by light 22. Using these distances we can determine angularity according to the following formula:

$$\text{Angularity} = \frac{D_{30} - D_{29}}{D_{22}}$$

where $D_n$ is the distance at the intervals marked by indicator lights 22, 29 and 30. Angularity be can converted to thousandths of an inch per inch. Once angularity is determined we can calculate offset from the following formula:

$$\text{offset} = \text{angularity} \times D_{31} - D_{29}$$

where $D_n$ is the distance at the intervals marked by indicator lights 31 and 29.

It should be noted that the offset determination involves the taking of a measurement $D_{31}$ from the centerline of the coupling which we define as a line running parallel to the two coupling half faces through a point midway between them. We have chosen to measure from the centerline of the coupling for a number of practical reasons. First, the centerline can be determined easily by the machinist without disassembling the coupling. Second, the centerline is likely to be close to the point where the axes of the coupled shafts would intersect if there were no offset. Third, if other points along the coupling and shafts were chosen that would increase the temptation to use a straight edge to determine offset. The straight edge method is subject to error from the machinist's touch.

It should be further noted that our method utilizes measurements taken from specific points around the machine to be shimmed rather than gauge readings along the coupled shafts. Therefore, the user cannot come within set angularity and offset limits by adjusting his gauges rather than by moving the machine to be shimmed. If the calculated angularity and offset are not within set tolerances the user must shim the machine to be shimmed and repeat the calculations. Such shimming will move the coupled shafts to a closer alignment.

While our method could be practiced with the aid of a standard calculator, we prefer to provide a calculator which tells the user what measurements to take, remembers the equations and makes the calculations.

DESCRIPTION OF THE PREFERRED EMBODIMENT OF THE CALCULATOR

Referring to FIGS. 2 and 3, the calculator is comprised of a face plate 2 fitted onto a housing 4 in which the circuitry is contained. Rubber legs 6 are provided on the bottom of the housing. The face of the device contains a keyboard 8, includes "ON" and "OFF" switches 9 and 10, method switches 12, 13 and 14, battery level indicator 15, LCD display 16 and a plurality of light emitting diodes 18 through 34. Diodes 20 through 31 light in sequence to tell the user what data to enter. Diodes 18 and 19 tell the user the units of measurement to use. Diodes 32, 33 and 34 identify the method which the user as selected. Because measurements are often made in eighths of an inch we prefer to include keys for those fractions in the keyboard 8 as shown. One could also use a keyboard which permits decimal entries.

Shaft alignments are determined by measuring the relative position of the two shafts. This can be done by attaching an L-shaped bar to one shaft so that its unattached end is above the second shaft. Then gauges are suspended from the L-shaped bar to engage the second shaft or a clamp attached to the second shaft. The position of the gauges depends upon which equation or method is being used to calculate misalignment. In the indicator reverse method illustrated near diode 34 two L-shaped bars are used and one gauge is mounted above each shaft. In the two indicator methods illustrated near diodes 32 and 33 two gauges are suspended over a clamp on one shaft and take measurements at right angles to one another. With our calculator the mechanic can use any of these methods. If he choses a two indicator method he may take his measurements on either shaft. Diagrams near diodes 32, 33 and 34 on the face plate 2 of the calculator illustrate the positions of the gauges in each of these methods. In these diagrams we show clamps having faces parallel and perpendicular to the shafts to which they are attached. The gauges engage one of the clamp's surfaces as shown.

OPERATION OF THE CALCULATOR

To operate our calculator the user turns on the power with switch 9 and then selects the method he intends to use with switches 12, 13 and 14. If he wishes to use the indicator reverse method he pushes switch 14. For either of the two indicator methods he hits switches 12 or 13. The computer is programed to recognize only the first method selection switch which is pushed. The diagrams associated with switches 12, 13 and 14 illustrate the positions in which the mechanic should place his gauges on the machines to be aligned. Then the mechanic enters measurements and readings in the sequence given by LED's 20 thru 31. After all data has been entered the calculator will calculate the amount to shim the front foot and the back foot of the machine to be shimmed to obtain a perfect alignment. The mechanic can read in display 16 the amount to shim the front foot of the machine by pressing the front foot (FRT FT) key. To determine how much to shim the back foot of the machine he simply presses the back foot (BK FT) key. The calculator will also calculate the angularity and offset of the present equipment. To find these values, the user pushes the the angularity (ANG) key 36 or offset (O-S) key 37 located above the display 16.

To illustrate the operation of the invention in detail, suppose the mechanic has chosen the indicator reverse method. First he will set his gauges as shown in diagram near diode 34. Then he pushes the power switch 9 marked "ON" and hits key 14. At that point LED's 34, 20 and 18 will light. This tells the mechanic to enter the distance in inches between the two gauges. The mechanic presses the appropriate numerical keys on the keyboard and the entry is displayed on display 16. If the display is correct he presses the enter (ENT) key which enters the reading into the calculator's memory, clears the display and causes LED's 18 and 21 to light calling for entry of the next reading. If the mechanic has typed the wrong numbers and the display is incorrect, he can clear the display with the clear (CLR) key and type in the correct figures. After the first entry gas been made LED's 31 and 18 will light to tell the user to enter the distance between the coupling center line and the front foot of the machine to be shimmed. That distance will be used in the offset calculation. When this measurement has been entered LED's 18 and 21 will light to tell the user to enter the distance in inches from the front foot of the machine to be shimmed to the gauge abutting the shaft of that machine. When that entry has been made LED's 18 and 22 light to call for entry of the distance in inches between the front and back feet of the machine to be shimmed. After that figure is entered LED's 19 and 23 light to tell the mechanic to enter the reading in thousandths of an inch from the gauge abutting the shaft of the machine to be shimmed. Next LED's 19 and 24 will light to call for entry of the reading in thousandths from the second gauge. That is the final data entry. After it is made LED's 19 and 29 will light and a number will appear in display 16. That number is the amount in thousandths by which to shim the front foot of the machine to be shimmed. A positive number tells the operator to add shim stock and a negative number means shim stock must be removed. To find the amount to shim the back foot of that machine the operator presses the back foot (BK FT) key. Thereafter, he can press the front foot (FRT FT) key to recall the front foot shim requirement. To check any of the data entries one can use the recall (RCL) key which will recall the data entries in order. As each entry is recalled the appropriate LED's will light to indicate which measurement is being displayed.

To determine the required horizontal movement the mechanic depresses the clear indicator (CLR IND) key which sets the display at zero and causes LED's 19 and 23 to light. The lit LED's tell the mechanic to turn the shaft 90° so the gauges are horizontal set the gauge nearest the machine to be shimmed to zero, rotate the shaft 180° read the same gauge and enter that reading. When that entry is made LED's 19 and 24 will light telling the mechanic to follow a similar procedure for the second gauge. Following this entry LED's 19 and 29 will light and a number will appear in display 16. That number is the distance to move the front foot of the machine to be shimmed. If the number is positive the front foot of the machine must be moved away from the side at which the gauge corresponding to LED 23 was located when read. When the back foot (BF FT) key is pressed the distance by which the back foot should be moved will appear in the display and LED's 19 and 30 will light. In using this procedure the user normally must adjust his gauges to compensate for indicator sag caused by the bending of the mounting hardware.

The two indicator methods work much the same way as the indicator reverse method. The mechanic sets his gauges as shown in the diagrams near diodes 32 or 33 and activates the calculator with "ON" key 9. Next he selects the two indicator method which corresponds to his set-up by pushing key 12 or 13. Then he enters the measurements or readings indicated by the lit LED's. As each entry is made other LED's will light to indicate the next entry required until all data is entered. Then LED's 19 and 29 will light and the amount to shim the front foot of the machine will appear in the display 16. To find the amount to shim the back foot the operator presses the back foot (BK FT) key and reads the display 16. If the set up of the diagram near diode 32 is used the data input LED sequence will be 25 and 18, 27 and 18, 31 and 18, 22 and 18, 24 and 19, and 28 and 19. For the set up shown near diode 33 the data input LED sequence is 25 and 18, 31 and 18, 21 and 18, 22 and 18, 23 and 19, and 26 and 19.

Should the machine to be shimmed have more than two support points the clear distance (CLR DST) key enables one to determine how much to shim the intermediate feet. After answers have been obtained for the front and back feet the operator presses the clear distance (CLR DST) key. Then LED's 22 and 18 will light to signal that the distance from the front foot to the intermediate foot should be entered. After the operator enters that value LED's 30 and 18 will light and the amount by which the intermediate foot must be shimmed will appear in display 16.

If one discovers that the machine to be shimmed was resting on three rather than four feet the gauge readings will be inaccurate. The clear indicator (CLR IND) key will clear the data which was entered for both gauge readings. Then the user can correct the "soft foot" condition, take new gauge readings and enter the new readings. The distance measurements will be retained by the calculator and need not be entered again.

We prefer to program the calculator to round off all answers to the nearest one-half (i.e. 0.50 thousandths) because the thinnest shim stock available is 0.50 thousandths.

We also prefer to provide interlocks to prevent loss of data and incorrect entries. After a method is selected the method selector switches are electronically bypassed and movement of those switches has no effect. We do this by programing the calculator to recognize only the first signal from the method selector switches. To change the method choice one must turn the calculator OFF and ON again. We further prefer to electronically bypass the clear entry (C) key when answers are in the display. Again, we prefer to do this through software rather than hardware. The minus (−) key shown in FIG. 3 is really a blank key not connected to anything. This can readily be seen in FIG. 5. Finally, the enter (ENT) key will cause data put in the display to be entered and progression to the next data entry to automatically occur. An interlock is provided so that subsequent depressing of the enter key will not cause progression or any data entry to occur unless new data has been put into the display. This interlock feature is also created through the software and helps prevent omission of required data.

THE PREFERRED CIRCUITRY

Figure 4:
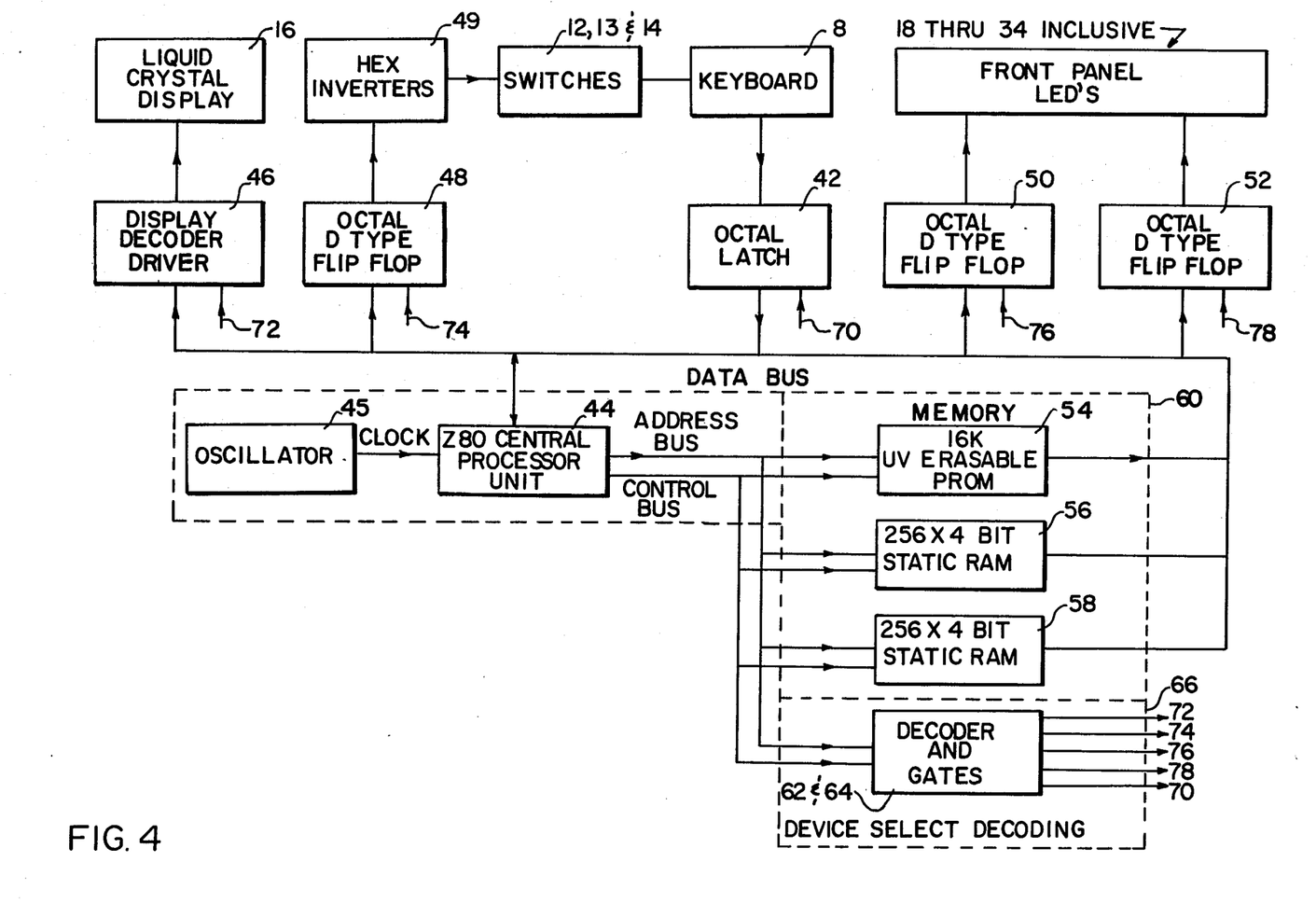
FIG. 4 is a block diagram of a present preferred embodiment of the invention.

FIG. 4 is a block diagram of the preferred circuitry of our invention which illustrates how current flows within the device. A detailed circuit diagram appears in FIG. 5. In this circuit, we prefer to use the components listed in Table I which also contains the reference number given each component in the drawings.

TABLE I

| Drawing Ref. | Part No. | Description |
| --- | --- | --- |
| 8 | KBA 3150 | Bowmar keyboard |
| 16 | FE0206C | AND liquid crystal display |
| 47 | CD4030BE | RCA quad exclusive-or gate |
| 46 | ICM7211AMIPL | Intersil four digit display decoder driver |
| 48, 50, 52 | SN74LS273N | Signetics 8-bit register |
| 42 | SN74LS373N | Signetics 8-bit register |
| 49 | SN7406N | Signetics hex inverter buffer driver |
| 45 | SN74LS13N | Signetics dual 4 input schmitt trigger |
| 44 | MK3880N | Mostek Z80 - CPU |
| 54 | IP2716 | Intel 16k (2k × 8) UV erasable PROM |
| 62 | SN74LS139N | Signetics dual 1 - of - 4 decoder |
| 64 | SN74LS32N | Signetics quad 2 |

TABLE I-continued

| Drawing Ref. | Part No. | Description |
| --- | --- | --- |
| 56, 58 | IP5101L-1 | input or gate Intel 256 × 4 bit static CMOS RAM |

Figure 5:
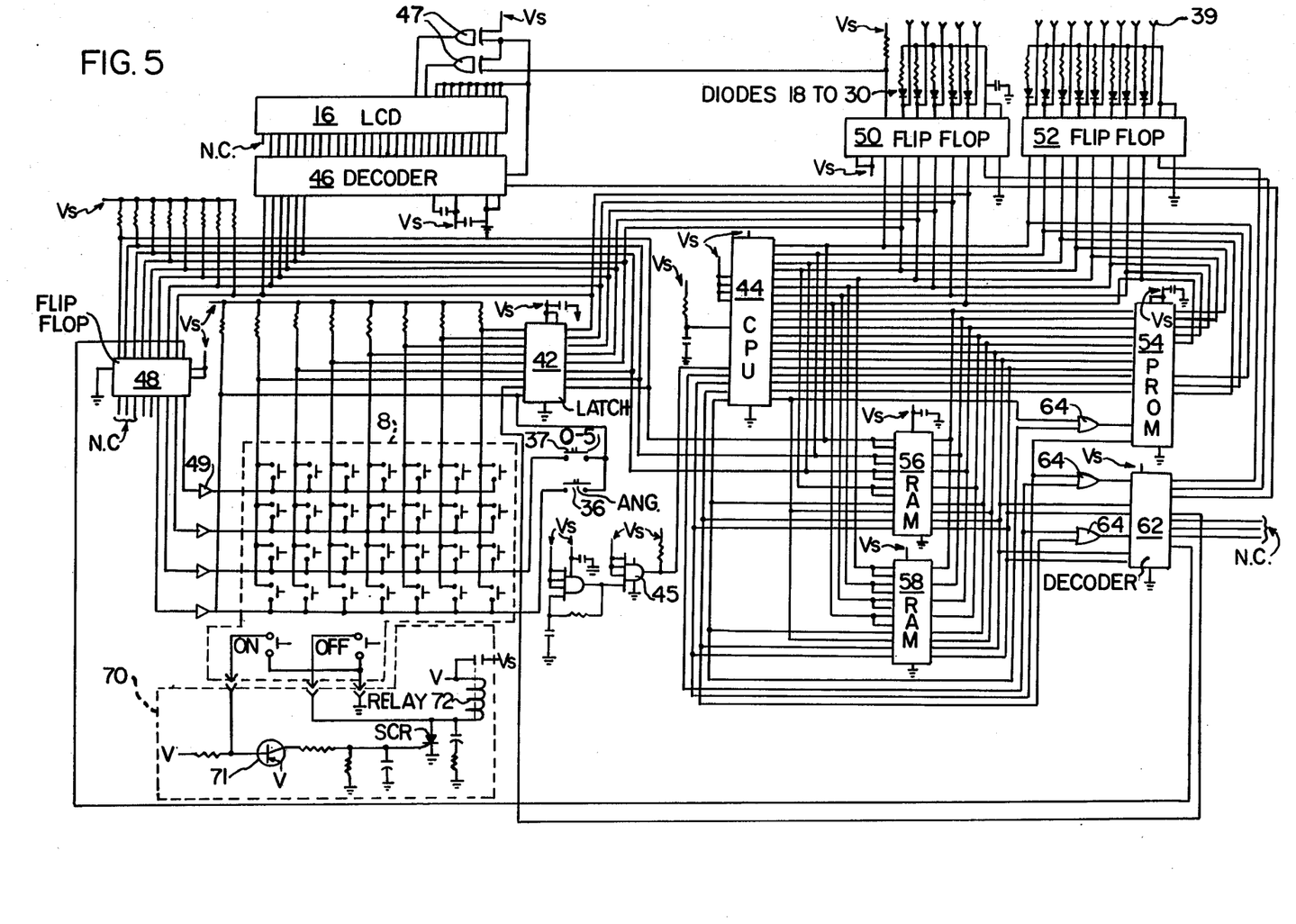
FIG. 5 is a detailed circuit diagram of a present preferred embodiment of the invention.

Referring to FIGS. 4 and 5 the keyboard 8 is connected to latch 42 which in turn is connected to central processing unit 44, display decoder driver 46 and octal D type flip flops 48, 50 and 52. Flip flop 48 is connected to the keyboard 8 and switches 12, 13 and 14, which are used to select the alignment method to be used through hex inverters 49. A display decoder driver 46 and gates 47 are connected to liquid crystal display 16. Flip flops 50 and 52 are connected to LED's 18 thru 34. Terminals 39 can be provided for auxiliary indicators (not shown). A 16K programable memory 54 and two 256×4 bits static RAM's 56 and 58 form the memory unit 60. CPU 44 inputs into memories 54, 56 and 58 providing the address for the memories and into decoder 62 and gates 64 which form the decoding unit 66. Both the decoding unit 66 and the memory unit 60 are connected to the display decoder driver 46. Decoder 66 connects to latch 42 through wire 70 and to flip flops 48, 50 and 52 through lines 72, 74, 76 and 78 (FIG. 4). Finally a schmitt trigger 45 is wired to the CPU 44 and acts as an oscillator. Terminals of the display 16, flip flop 48 and decoder 62 which are not used are marked "N.C." in FIG. 5.

Because we have chosen to use separate buttons to turn our calculator ON and OFF we created a latching relay circuit shown in box 70 on FIG. 4 which plugs into the ON and OFF buttons as shown. A voltage V enters the circuit from a power supply (not shown). When the ON switch is pushed current flows through the resistors to turn transistor 71 ON. This couples a voltage to the gate of the SCR. The voltage turns the SCR "ON" and pulls relay 72. The relay's contacts then permit a voltage labeled $V_s$ to flow to the microprocessor entering at those points outside box 70 marked $V_s$. When the "ON" button is released transistor 71 turns off the voltage to the SCR gate but the SCR remains ON. When the "OFF" switch is pressed the anode and cathode of the SCR are shorted which causes the SCR to turn "OFF". Current now flows through the coil of relay 72 and the contacts of the "OFF" switch. When the "OFF" switch is released, the relay coil is de-energized and the relay contacts open removing power from the micro-processor circuitry. If desired, a simple ON-OFF switch could be substituted for this circuit.

When the calculator is turned ON a signal will flow from the CPU 44 and memory unit 60 through the display decoder driver 46 to display 16 so that a zero reading will appear on the display. Simultaneously LED's 32, 33 and 34 will light telling the user to select a method. After a method is selected appropriate LED's 18 thru 31 will light. Data entered through keyboard 40 travels to the display 16 and memory unit 60. When the enter (ENT) key is pressed data in the display is stored in the memory, the display goes to zero and new LED's are lighted to signal the operator to enter additional data. The programable memory contains the well known equations for determining how much to shim the machine to be aligned. The equations for the Indicator Reverse Method are:

$$\left[ (r_{23} + r_{24}) \left( \frac{d_{21}}{d_{20}} \right) + r_{23} \right] - 2 = s_{29}$$

$$\left[ (r_{23} + r_{24}) \left( \frac{d_{21} + d_{22}}{d_{20}} \right) + r_{23} \right] - 2 = s_{30}$$

The equations for the two indicator method illustrated on the face plate near diode 32 are:

$$\frac{d_{27} \times r_{28}}{d_{25}} - \frac{r_{24}}{2} = s_{29}$$

$$\frac{(d_{27} + d_{22})}{d_{25}} r_{28} - \frac{r_{24}}{2} = s_{30}$$

The equations for the two indicator method illustrated on the face plate near diode 33 are:

$$\frac{d_{21} \times r_{26}}{d_{25}} + \frac{r_{23}}{2} = s_{29}$$

$$\frac{(d_{21} + d_{22}) r_{26}}{d_{25}} + \frac{r_{23}}{2} = s_{30}$$

Where
$d_n$=the distance shown in FIG. 2 at LED n,
$r_n$=the reading taken at gauge n in FIG. 2,
$s_{29}$=the amount to shim the front foot of the machine, and
$s_{30}$=the amount to shim the back foot of the machine.
As data is entered into the calculator it inserts the data into the appropriate equations and solves them. When the last required data is entered the distance by which the feet of the machine must be shimmed will appear on the display 16 and appropriate LEDs will light to give the units of the numerical answer and indicate to which foot of the machine the answer applies.

The calculator will also compute the angularity and offset of the shaft on the machine to be shimmed at the time the measurements are taken. To find those values the user pushes the angularity (ANG) key 36 or the offset (O-S) key 37. When the key is pushed, the angularity or offset appears in the display.

We expect that users will establish standards for acceptable angularity and offset. If the values found by the user are within those tolerances the alignment would be deemed acceptable and no shimming need be done. If the values are outside the tolerances, the user must shim the machine and then repeat the calculation. For example, suppose the user follows a two indicator method. After the data has been entered he is told by the calculator to shim the front foot of his machine 15 thousandths and to shim the back foot 32.5 thousandths. He also learns that the angularity and offset values for the present alignment are unacceptable. Ideally, he would want to shim his machine by the exact amount the calculator has told him. But, suppose he only has shims which are 10 thousandths of an inch thick. He can put three shims under the front foot and one shim under the back foot. Then he takes new gauge readings and measurements, enters them into the calculator and gets new values for offset and angularity. If those values are still unacceptable he may try adding a second shim to the back foot. Recognizing that he cannot achieve a perfect alignment with the shims he has, with our method and calculator he is able to achieve the best alignment possible under the circumstances. That best alignment may also be within the tolerances he has attempted to meet.

One cannot determine which alignment is best by merely knowing shim distances for the machine. On a small machine the alignment may be acceptable even though our calculator tells the user to shim the machine. Yet, the same readings on a larger machine will correspond to an unacceptable alignment. Furthermore, without knowing offset and angularity values for each adjustment the user in our example could not decide with any degree of certainty whether it would be better to shim the front foot by 10 thousandths or 20 thousandths. Thus, our method and calculator give the shop mechanic an important new tool that enables him to achieve an acceptable alignment within the contraints he is likely to encounter in real-life situations.

While we have shown and described a present preferred embodiment of the invention it is to be distictly understood that the invention is not limited thereto but may be otherwise variously embodied within the scope of the following claims.

We claim:

1. A alculator for calculating at least one of offset and angularity of two interconnected drive shafts with respect to one another comprising;
   a. a keyboard having at least numerical keys for inputting measurement data,
   b. a display connected to the keyboard for displaying numbers typed on the keyboard and numbers calculated therefrom,
   c. a face plate to which the keyboard and display are attached having thereon:
      (i) at least one illustration of a stationary machine having a shaft connected to a shaft of a machine to be shimmed with gauges mounted on the shafts, and
      (ii) indicia near the illustration which identifies
         (a) a coupling center line through the connected shafts,
         (b) a front foot and a back foot of the machine to be shimmed,
         (c) distances between the gauges,
         (d) a distance between the front foot and the back foot of the machine to be shimmed,
         (e) a distance between the coupling center line and the front foot of the machine to be shimmed, and
         (f) at least one distance between the gauges and one foot of the machine to be shimmed,
   d. a memory unit storing at least one program and capable of storing the input measurement data,
   e. indicator means attached to the face plate near the illustration and indicia to indicate places to be measured in a sequence compatible with a program contained in the memory unit,
   f. a processing unit connected to the keyboard, memory and display for receiving data entered on the keyboard, calculating at least one of offset and angularity according to a program contained in the memory and transmitting a result to the display, and
   g. a decoding unit connected to the processing unit, display, indicator means and memory for receiving signals from the processing unit and for actuating the indicator means, display and memory.

2. The calculator of claim 1 wherein the indicator means are light emitted diodes.

3. The calculator of claim 1 wherein the memory also contains a second program which contains information that defines at least one equation which when implemented computes shaft alignment.

4. A method for determining the angularity of two coupled shafts one of which extends from a first machine and the second of which extends from a second machine having at least a back foot and a front foot comprising the steps of:
   a. determining a first distance by which the front foot of the second machine must be shimmed to achieve a perfect alignment of the coupled shafts,
   b. determining a second distance by which the back foot of the second machine must be shimmed to achieve a perfect alignment of the coupled shafts,
   c. computing a difference between the first and second distances,
   d. measuring a third distance between the front foot and the back foot of the second machine, and
   e. dividing the computed difference of step c by the third distance thereby obtaining angularity.

5. The method of claim 4 wherein the distances in which the front foot and back foot must be shimmed are measured in thousandths of an inch, the distance between the front foot and the back foot are measured in inches and the result of step e gives units in inches per inch and a number which has at least one decimal place beyond thousandths, also comprising the step of rounding the angularity to thousands of an inch per inch.

6. A method for determining the offset of two coupled shafts one of which estends from a first machine and the second of which extends from a second machine having at least a back foot and a front foot comprising the steps of:
   a. determining a first distance by which the front foot of the second machine must be shimmed to achieve a perfect alignment of the coupled shafts,
   b. determining a second distance by which the back foot of the second machine must be shimmed to achieve a perfect alignment of the coupled shafts,
   c. computing a difference between the first and second distances,
   d. determining a third distance between the front foot and the back foot of the second machine,
   e. dividing the computed difference of step c by the third distance thereby obtaining angularity,
   f. defining a coupling center line through the coupling shafts,
   g. measuring a fourth distance between the coupling center line and the front foot of the second machine,
   h. multiplying the angularity by the fourth distance to create an interim number, and
   i. substracting from the interim number the first distance thereby obtaining offset.

7. A method for determining the offset of two coupled shafts one of which extends from a first machine and the second of which extends from a second machine having at least a back foot and a front foot comprising the steps of:
   a. determining a first distance by which the front foot of the second machine must be shimmed to achieve a perfect alignment of the coupled shafts,
   b. determining a second distance by which the back foot of the second machine must be shimmed to achieve a perfect alignment of the coupled shafts,
   c. computing a difference between the first and second distances, d. determining a third distance between the front foot and the back foot of the second machine, e. dividing the computed difference of step c by the third distance thereby obtaining angularity, f. defining a reference line through one of the coupling and the coupled shafts, g. measuring a fourth distance between the reference line and the front foot of the second machine, h. multiplying the angularity by the fourth distance to create an interim number, and i. subtracting the first distance from the interim number thereby obtaining offset.

8. A calculator for calculating at least one of offset and angularity of two interconnected drive shafts with respect to one another comprising:

a. a keyboard having at least numerical keys for inputting measurement data, b. a display connected to the keyboard for displaying numbers typed on the keyboard and numbers calculated therefrom.

c. a face plate to which the keyboard and display are attached having thereon:
  (i) at least one illustration of a stationary machine having a shaft connected to a shaft of a machine to be shimmed with gauges mounted on the shafts, and
  (ii) indicia near the illustration which identifies
    (a) a reference line through one of the coupling and the connected shafts,
    (b) a front foot and a back foot of the machine to be shimmed,
    (c) distances between the gauges,
    (d) a distance between the front foot and the back foot of the machine to be shimmed,
    (e) a distance between the coupling reference line and the front foot of the machine to be shimmed, and
    (f) at least one distance between the gauges and one foot of the machine to be shimmed, d. a memory unit storing at least one program and capable of storing the input measurement data, e. indicator means attached to the face plate near the illustration and indicia to indicate places to be measured in a sequence compatible with the program, f. a processing unit connected to the keyboard, memory and display for receiving data entered on the keyboard, calculating at least one of offset and angularity according to the program contained in the memory and transmitting a result to the display, and g. a decoding unit connected to the processing unit, display, indicator means and memory for receiving signals from the processing unit and for actuating the indicator means, display and memory.

* * * * *

UNITED STATES PATENT AND TRADEMARK OFFICE
CERTIFICATE OF CORRECTION

PATENT NO. : 4,623,979

DATED : November 18, 1986

INVENTOR(S) : JOHN M. ZATEZALO, LUCIAN J. SPALLA

It is certified that error appears in the above-identified patent and that said Letters Patent is hereby corrected as shown below:

Column 2, line 57, change "enter" to --center--.

Column 3, line 20, change "those" to --Those--.

Column 6, line 41, delete the second instance of "the".

Column 6, line 59, change "gas" to --has--.

Column 5, line 58, change "as" to --has--.

Column 7, line 26, after horizontal, insert --,--.

Column 7, line 28, after 180°, insert --,--.

Column 7, line 37, change "BF" to --BK--.

Column 11, line 24, change "alculator" to --calculator--.

Column 11, line 26, change ";" to --:--.

Signed and Sealed this

Twenty-first Day of April, 1987

Attest:

DONALD J. QUIGG

Attesting Officer

Commissioner of Patents and Trademarks